Patented June 1, 1926.

1,587,485

UNITED STATES PATENT OFFICE.

ALEXANDER LOWY, OF PITTSBURGH, PENNSYLVANIA.

PROCESS OF PRESERVING.

No Drawing.   Application filed October 28, 1925. Serial No. 65,471.

My invention relates to the process of preservation of food products, and more particularly to beverages, and extracts or syrup concentrates therefor, especially of the kind having cocoa, as one of its essential constituents. My invention still further relates to beverages of the "soft drink" variety sold bottled, ready to serve either with still or charged carbonated water, and contemplates its preservation so that it will not deteriorate in storage for indefinite periods by reason of putrefaction, fermentation, decomposition as a result of the bacterial organism content.

As hitherto, preservatives have been added to food products such as cocoa beverages which form a permanent ingredient thereof, and though efficacious in this direction are objectionable because their nature is such as to affect in an undesirable way the taste of the food products and in some instances are injurious by reason of their toxicity.

Sterilizing treatments have also been adopted to avoid the addition of undesirable agents and in that direction, heating of the products has been practised with marked degree of success. However, this method of treatment has its objection, not only in the refinement of heat control but because of the adverse effect heat has upon the character of the food product.

Of the sterilizing treatments I have tried for chocolate (cocoa-milk) milk or skimmed milk beverages, the use of hydrogen peroxide has been by far the most desirable, because of the fugitive character of the active ingredient and because of the unobjectionable character of residue of the decomposition products thereof. This process, however, I have found undesirable in some of its phases, because it is difficult to gauge the right amount of hydrogen peroxide to be added. Also, different milks possess very varying powers of decomposing hydrogen peroxide, no doubt due to the amount of catalase which they contain. While this process renders the milk composition suitable for immediate consumption or suitable for storage for protracted periods of time, in this connection the process is no better than heat treatment, because on exposure the product is laid open to re-infection, particularly that occurring subsequently in the handling and packing of the milk product due to the rapid decomposition of the hydrogen peroxide and the expenditure thereof by the catalase. The oxygen nascent or otherwise passing off from the milk product is subject to rapid re-infection particularly under conditions normally existing in the premises of manufacturers of syrup extract or bottling works.

I have found that a cocoa product may be made which may be put up into forms such as concentrates or syrups for use by the soda-fountain dispenser or bottler, so that either the concentrate or the final beverage may be stored indefinitely without spoiling or otherwise being rendered unfit for use, by the treatment involving hydrogen peroxide, which will retard its decomposition when in combination with the food product to be preserved or carrying on the treatment under conditions which will retain the peroxide or its decomposition products in combination with the food product until ready to be consumed.

I have further found that cocoa, more particularly of the lower fat content serves to a marked extent to inhibit the rapid decomposition of a preserving agent such as hydrogen peroxide, which when used in connection therewith, will serve to prevent putrefaction, fermentation, souring or decomposition of flavoring syrups, concentrates, or beverages.

This invention, therefore, has for its object the provision of a preparation of a cocoa flavored syrup, concentrate or beverage either made with stilled or carbonated water, or generally a soft drink flavoring compound, syrup, concentrate or beverage including a normally decomposable or fermentable food ingredient, which will remain unaltered in storage and will not ferment, putrefy, sour or otherwise decompose in storage.

My invention still further has for its object the provision of a method of preserving a cocoa flavored product such as syrup, concentrate or soft drink beverages including stilled or carbonated water or more generally to a method of preserving flavoring syrups, concentrates or beverages, involving hydrogen peroxide or its decomposition products and which, upon subsequent handling, packing, bottling or the like, will not be re-infected so as to spoil, decompose or ferment or otherwise become unfit for consumption.

To attain these objects and such further objects as may appear or be hereinafter pointed out, a more detailed description of my invention follows.

In practising my invention, I prepare a sweetening batch preferably of sugar and water to which is added cocoa and brought to a boil. Thereafter, I chill or otherwise cool the batch and then add hydrogen peroxide solution, preferably of a concentration (10 volumes) 3%. A mixture thus made, can be canned, bottled or used as the concentrate or syrup for soda fountain dispensing or bottlers' purposes, and will be found to be free from the objectionable decomposing or spoiling qualities of chocolate products heretofore made. For making beverages of the "pop" variety, additional syrup, flavors, still or carbonated water may be then added.

To obtain a cocoa product having unusually high keeping qualities, in the batch above made, the cocoa used is of a low cocoa fat content and for this purpose a cocoa is chosen having a cocoa fat content of 13 to 18%. The hydrogen peroxide is preferably added when the mixture has been cooled substantially below 25° C., although a temperature of between 25 to 30° C. will serve to produce very good results. The hydrogen peroxide that is added should not be less than 2 cubic centimeters per ounce of syrup mixture.

In practising my invention as above outlined, I have found that I can use a lower sugar concentration and a high cocoa addition without the danger of having sugar fermentation take place as in cases where I prepare a flavoring concentrate. The advantage of this practice will be obvious when it will be observed that ordinarily, the sugar content is made so high as to be in excess, and thus prevent alcoholic fermentation.

As a more detailed outline for practising my invention which is cited merely for the purpose of illustration, I proceed as follows:—200 lbs. of sugar are mixed with 13½ gallons of water.

Before the entire sugar is in solution, add 60 lbs. of cocoa (preferably cocoa fat content 13 to 18%). The mix is then brought to a boil. Cool, and at this stage or any other time if desired, add 40 grams of salt and flavors, vanillin, coumarin, vanillic ester to taste.

The mixture is then further cooled preferably below 25° C. though a temperature of 25° to 30° C. will do.

There is then added 5 to 6 (preferably 5) gallons of (10 valumes) 3% hydrogen peroxide. This mixture is preferably immediately packed, bottled or canned to be distributed to the bottler, or soda fountain dispenser. Preferably, the resulting mixture should be stored in a cool place. The batch thus made may be then diluted with concentrated sweetening substances of the carbohydrate variety.

For purposes of making a "pop" bottle drink, a mixture as above made is diluted to the extent of about 1 to 1.5 ounces of the mixture to 5.5 to 7.5 ounces of stilled or carbonated water. In this connection, a pressure of 15 to 30 lbs. is maintained in the "pop" bottle or that equivalent to the addition of about 2½ volumes of the modifying gas preferably carbon dioxide. When thus bottled, the hydrogen peroxide content should be about 1.75 cc. of hydrogen peroxide (10 volumes) (3%) per 7 ounces of fluid.

A cocoa mixture as made above will keep indefinitely without spoiling or otherwise being rendered unfit for consumption. The hydrogen peroxide content persisting for a period of time not heretofore obtainable and preventing reinfection. Such conditions are most remarkably achieved in the case of the bottled product wherein hydrogen peroxide or the decomposition products thereof including nascent oxygen are retained therein to prevent re-infection, particularly when used in connection with thickening or enriching agents in the manner hereinafter described.

The more preferably method to accomplish the preservation is to use the following formula as for example:—10 gallons 32° Baumé sugar syrup; 5 gallons of prepared chocolate (cocoa, sugar syrup and flavor); 9 gallons of water; 60 ounces of $H_2O_2$ (10 volumes) (3%).

Mix the above constituents and immediately bottle. Use 2 ounces of above mixture to each 6½ ounce bottle of "pop." If a milky characteristic is desired, suspend or dissolve in the above batch 5 pounds of powdered milk or skimmed milk.

In the final beverage which is preferably put up into bottles containing about 7 ounces of fluid beverage, there will be present about 1.7 cc. (10 volumes) (3%) hydrogen peroxide per the fluid contents preserved under pressures corresponding to those normally used in bottling such product.

Where it is desired to thicken or otherwise enrich the product, whether a cocoa product or beverage, or any other flavored product as above made, milk, malt, starches, gelatine, food stuffs containing carbohydrates, proteins, fats, mineral salts or vitamins may be added.

It will be observed that the hydrogen peroxide having been added at a temperature which will inhibit the rapid decomposition of the hydrogen peroxide by the bacteria or catalase ordinarily producing its decomposition, the nascent oxygen will be liberated slowly and serve to prevent bacterial growth, fermentation, putrefaction or decomposition which would otherwise take place to render the product unfit for use after extended storage. The bottling of this product, particularly in pressure bottles with the amounts of the hydrogen peroxide assure its presence in quantities advantageous for the prolonged preservation preventing re-infection after the initial handling and treatment of the product. The quantities of peroxide used are never such as to adversely affect the quality or flavor of the products.

It will thus be observed that I have, by my method, procured a product having the preserving or keeping qualities which otherwise would normally induce re-infection.

Having thus described my invention and illustrated its use, what I claim as new and desire to secure by Letters Patent, is:—

1. The process of preparing a cocoa product, having high preserving qualities which includes preparing a mixture of syrup and cocoa and then adding thereto a dilute solution of hydrogen peroxide under conditions of control so that the rapid decomposition of the hydrogen peroxide is inhibited and packing the resulting product.

2. The process of preparing a cocoa product, having high preserving qualities which includes preparing a mixture of syrup and cocoa and then adding thereto a dilute solution of hydrogen peroxide while maintaining the cocoa mixture substantially not higher than 30° C. and preferably below 25° C., so that the rapid decomposition of the hydrogen peroxide is inhibited and packing the resulting product.

3. The process of preparing a cocoa product which includes adding to a mixture containing cocoa of a low cocoa fat content a solution of hydrogen peroxide and packing the mixture to retain hydrogen peroxide in the product in a substantially undecomposed condition.

4. The process of preparing a cocoa product having high preserving qualities, which includes preparing a mixture of syrup and cocoa and then adding thereto a dilute solution of hydrogen peroxide at low temperatures, further diluting the product with water and retaining the product under pressures of between 15 to 30 lbs. whereby the rapid decomposition of the hydrogen peroxide is inhibited.

5. The process of preserving a cocoa product including milk which comprises adding hydrogen peroxide thereto at temperatures not higher than substantially 30° C. and preferably below 25° C., and maintaining the same under pressure so as to prevent the rapid decomposition of the hydrogen peroxide.

6. A preserving process for soft drink beverages comprising mixing the ingredients ordinarily used for the batch, cooling the same, thereafter adding a dilute solution of hydrogen peroxide at temperatures not higher than substantially 30° C. and preferably below 25° C., further diluting with water and immediately bottling the same.

7. The process of preparing a cocoa product having high preserving qualities which includes preparing a mixture of syrup, cocoa and milk and then adding thereto a dilute solution of hydrogen peroxide at low temperatures so that rapid decomposition of the hydrogen peroxide is inhibited, further diluting the product with water and packing the same.

In witness whereof, I have signed this specification, this third day of October, A. D. 1925.

ALEXANDER LOWY.